US012581532B2

(12) United States Patent
Ali et al.

(10) Patent No.: US 12,581,532 B2
(45) Date of Patent: Mar. 17, 2026

(54) ASSISTANCE FOR PERFORMING LISTEN-BEFORE-TALK OPERATIONS

(71) Applicant: Lenovo (Singapore) Pte. Ltd., New Tech Park (SG)

(72) Inventors: Ali Ramadan Ali, Kraiburg am Inn (DE); Robin Thomas, Bad Nauheim (DE); Ankit Bhamri, Rödermark (DE); Karthikeyan Ganesan, Kronberg im Taunus (DE); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 326 days.

(21) Appl. No.: 18/257,991

(22) PCT Filed: Dec. 13, 2021

(86) PCT No.: PCT/IB2021/061669
§ 371 (c)(1),
(2) Date: Jun. 16, 2023

(87) PCT Pub. No.: WO2022/130185
PCT Pub. Date: Jun. 23, 2022

(65) Prior Publication Data
US 2024/0057156 A1 Feb. 15, 2024

Related U.S. Application Data

(60) Provisional application No. 63/126,099, filed on Dec. 16, 2020.

(51) Int. Cl.
*H04W 74/0808* (2024.01)
*H04W 72/21* (2023.01)

(52) U.S. Cl.
CPC ....... *H04W 74/0808* (2013.01); *H04W 72/21* (2023.01)

(58) Field of Classification Search
None
See application file for complete search history.

(56) References Cited

U.S. PATENT DOCUMENTS

2018/0063736 A1* 3/2018 Sadeghi ................ H04W 24/10

FOREIGN PATENT DOCUMENTS

WO WO-2020119921 A1 * 6/2020 ........ H04W 72/1215

OTHER PUBLICATIONS

PCT/IB2021/061669, "Notification of Transmittal of the International Search Report and the Written Opinion of the International Searching Authority, or the Declaration", International Searching Authority, Apr. 4, 2022, pp. 1-10.

(Continued)

*Primary Examiner* — Suhail Khan
(74) *Attorney, Agent, or Firm* — Kunzler Needham & Hilton

(57) ABSTRACT

Apparatuses, methods, and systems are disclosed for assistance for performing listen-before-talk operations. One method includes exchanging, at a network device and with a UE in a second carrier without performing a listen-before-talk operation, assistance information for performing listen-before-talk for a first carrier. The method includes transmitting, to the UE on the second carrier without performing the listen-before-talk operation, an indication to perform interference measurement on the first carrier. The method includes receiving, from the UE on the second carrier, first assistance information including an indication of the results of interference measurement at the UE of the first carrier. The method includes transmitting, to the UE on the second carrier without performing the listen-before-talk operation, (Continued)

second assistance information including an indication of the results of interference measurement at the network device of the first carrier.

20 Claims, 7 Drawing Sheets

(56)                     References Cited

OTHER PUBLICATIONS

ETSI, "Electromagnetic compatibility and Radio spectrum Matters (ERM); Short Range Devices (SRD) using Ultra Wide Band technology (UWB); Harmonized EN covering the essential requirements of article 3.2 of the R&TTE Directive; Part 1: Requirements for Generic UWB applications", Final draft ETSI EN 302 065-1 V1.3.1, Feb. 2014, pp. 1-30.

Qualcomm Inc., "Email discussion on channel access mechanism for 52.6GHz-71GHz band", 3GPP TSG RAN WG1 Meeting #102-e R1-200xxxx, Aug. 17-24, 2020, pp. 1-13.

Qualcomm, "New WID on Extending current NR operation to 71 GHz", 3GPP TSG RAN Meeting #86 RP-193229, Dec. 9-12, 2019, pp. 1-5.

Intel Corp., "New SID: Study on supporting NR from 52.6GHz to 71 GHz", 3GPP TSG RAN Meeting #86 RP-193259, Dec. 9-12, 2019, pp. 1-3.

3GPP, "3rd Generation Partnership Project; Technical Specification Group Radio Access Network; Study on NR-based access to unlicensed spectrum (Release 16)", 3GPP TR 38.889 V16.0.0, Dec. 2018, pp. 1-119.

3GPP, "3rd Generation Partnership Project; Technical Specification Group Radio Access Network; NR; Physical channels and modulation (Release 16)", 3GPP TS 38.211 V16.3.0, Dec. 2020, pp. 1-133.

* cited by examiner

100

104

104

104

102

102

102

200

300

600

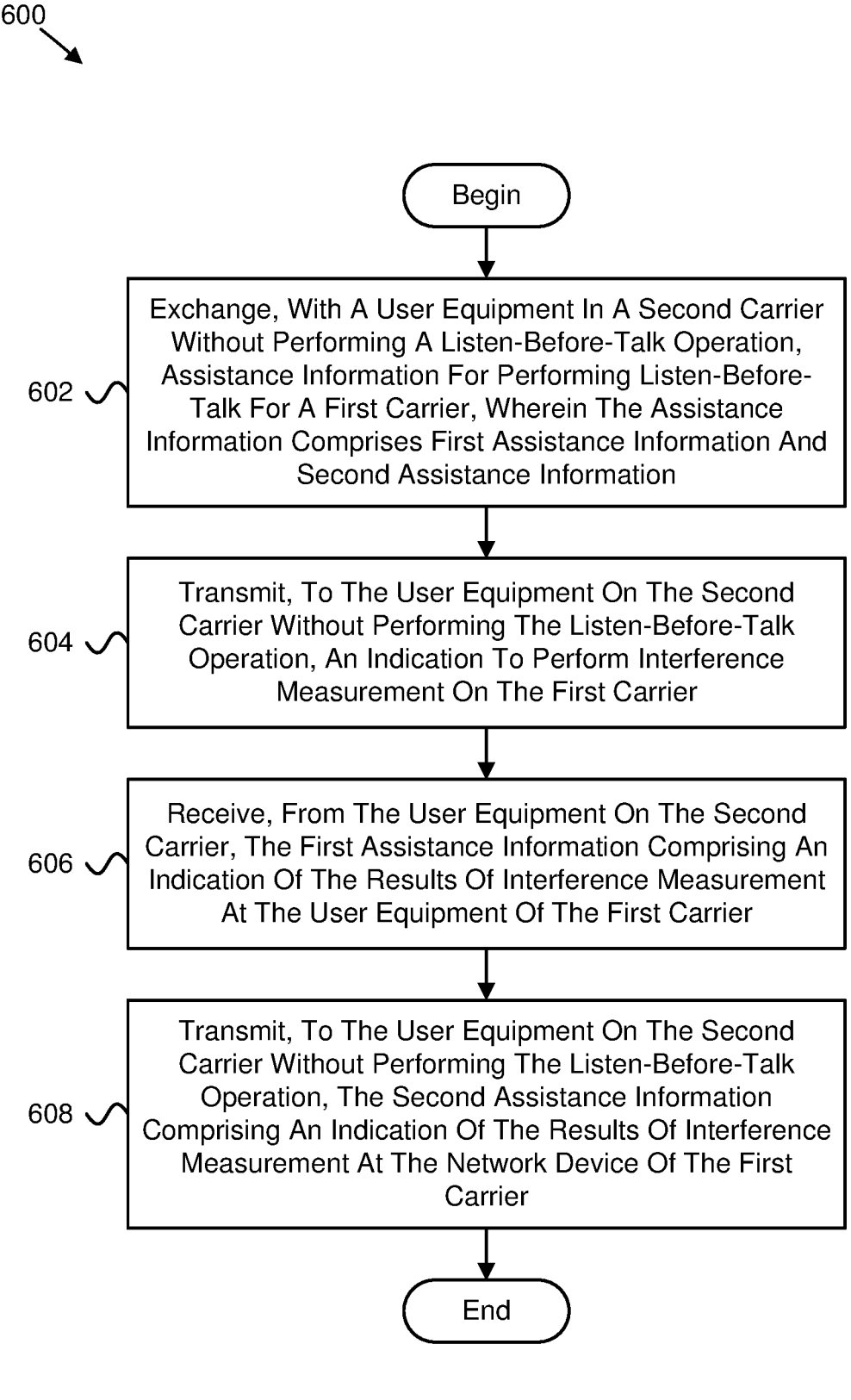

Begin

602 — Exchange, With A User Equipment In A Second Carrier Without Performing A Listen-Before-Talk Operation, Assistance Information For Performing Listen-Before-Talk For A First Carrier, Wherein The Assistance Information Comprises First Assistance Information And Second Assistance Information 604 — Transmit, To The User Equipment On The Second Carrier Without Performing The Listen-Before-Talk Operation, An Indication To Perform Interference Measurement On The First Carrier 606 — Receive, From The User Equipment On The Second Carrier, The First Assistance Information Comprising An Indication Of The Results Of Interference Measurement At The User Equipment Of The First Carrier 608 — Transmit, To The User Equipment On The Second Carrier Without Performing The Listen-Before-Talk Operation, The Second Assistance Information Comprising An Indication Of The Results Of Interference Measurement At The Network Device Of The First Carrier End

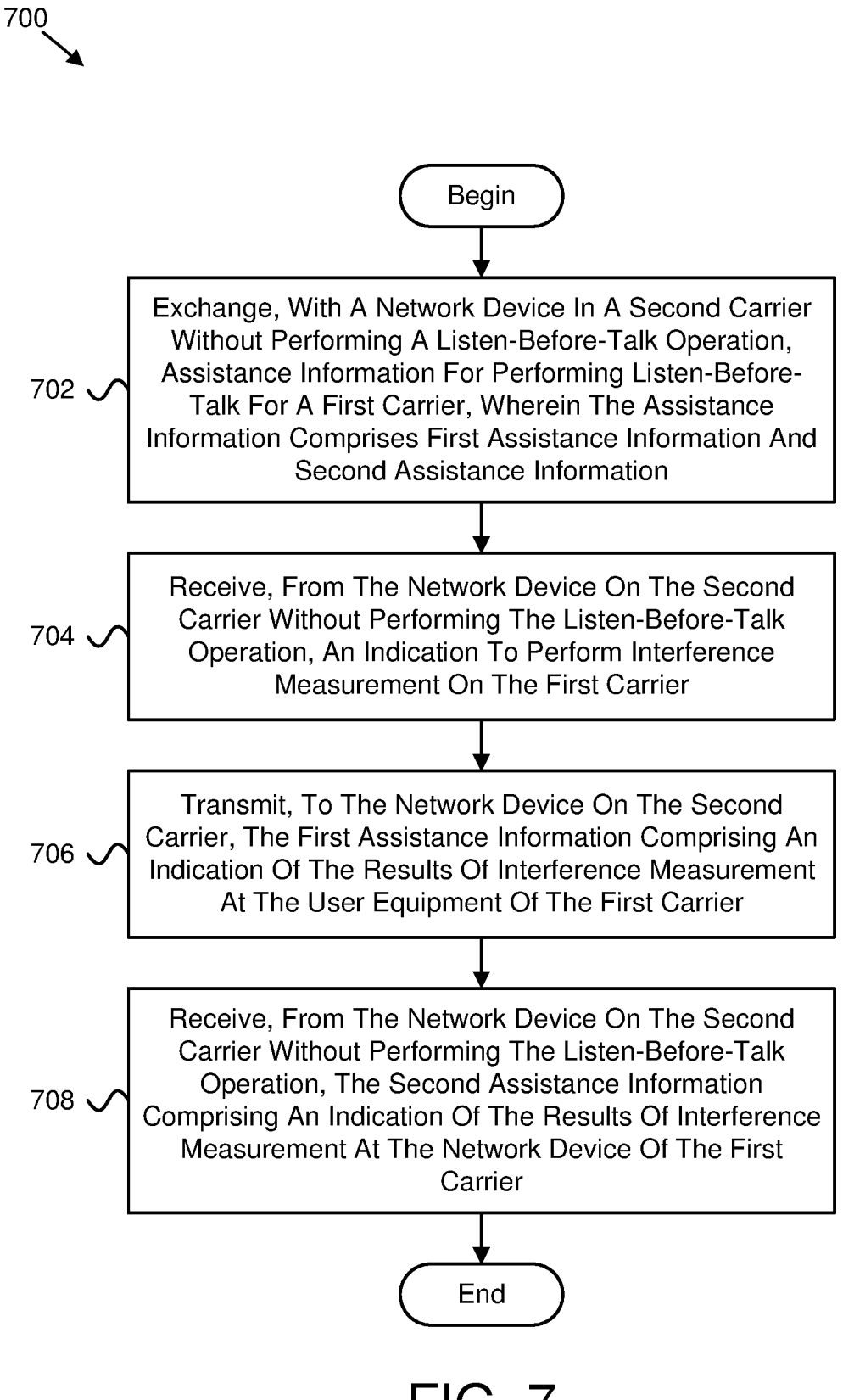

Begin

702 ∿ Exchange, With A Network Device In A Second Carrier Without Performing A Listen-Before-Talk Operation, Assistance Information For Performing Listen-Before-Talk For A First Carrier, Wherein The Assistance Information Comprises First Assistance Information And Second Assistance Information 704 ∿ Receive, From The Network Device On The Second Carrier Without Performing The Listen-Before-Talk Operation, An Indication To Perform Interference Measurement On The First Carrier 706 ∿ Transmit, To The Network Device On The Second Carrier, The First Assistance Information Comprising An Indication Of The Results Of Interference Measurement At The User Equipment Of The First Carrier 708 ∿ Receive, From The Network Device On The Second Carrier Without Performing The Listen-Before-Talk Operation, The Second Assistance Information Comprising An Indication Of The Results Of Interference Measurement At The Network Device Of The First Carrier End

FIG. 7

ASSISTANCE FOR PERFORMING LISTEN-BEFORE-TALK OPERATIONS

CROSS-REFERENCE TO RELATED APPLICATIONS

This application claims priority to U.S. Patent Application Ser. No. 63/126,099 entitled "APPARATUSES, METHODS, AND SYSTEMS FOR RECEIVER ASSISTANCE INFORMATION EXCHANGE FOR LBT USING A LOW POWER SIGNAL" and filed on Dec. 16, 2020 for Ali Ramadan Ali, which is incorporated herein by reference in its entirety.

FIELD

The subject matter disclosed herein relates generally to wireless communications and more particularly relates to assistance for performing listen-before-talk operations.

BACKGROUND

In certain wireless communications networks, listen-before-talk operations may be performed. In such networks, communication may not occur if a listen-before-talk operation is unsuccessful.

BRIEF SUMMARY

Methods for assistance for performing listen-before-talk operations are disclosed. Apparatuses and systems also perform the functions of the methods. One embodiment of a method includes exchanging, at a network device and with a user equipment in a second carrier without performing a listen-before-talk operation, assistance information for performing listen-before-talk for a first carrier. The assistance information includes first assistance information and second assistance information. In some embodiments, the method includes transmitting, to the user equipment on the second carrier without performing the listen-before-talk operation, an indication to perform interference measurement on the first carrier. In certain embodiments, the method includes receiving, from the user equipment on the second carrier, the first assistance information including an indication of the results of interference measurement at the user equipment of the first carrier. In various embodiments, the method includes transmitting, to the user equipment on the second carrier without performing the listen-before-talk operation, the second assistance information including an indication of the results of interference measurement at the network device of the first carrier.

One apparatus for assistance for performing listen-before-talk operations includes a network device. In some embodiments, the apparatus includes a transceiver that: exchanges, with a user equipment in a second carrier without performing a listen-before-talk operation, assistance information for performing listen-before-talk for a first carrier, wherein the assistance information includes first assistance information and second assistance information; transmits, to the user equipment on the second carrier without performing the listen-before-talk operation, an indication to perform interference measurement on the first carrier; receives, from the user equipment on the second carrier, the first assistance information including an indication of the results of interference measurement at the user equipment of the first carrier; and transmits, to the user equipment on the second carrier without performing the listen-before-talk operation, the second assistance information including an indication of the results of interference measurement at the network device of the first carrier.

Another embodiment of a method for assistance for performing listen-before-talk operations includes exchanging, at a user equipment with a network device in a second carrier without performing a listen-before-talk operation, assistance information for performing listen-before-talk for a first carrier. The assistance information includes first assistance information and second assistance information. In some embodiments, the method includes receiving, from the network device on the second carrier without performing the listen-before-talk operation, an indication to perform interference measurement on the first carrier. In certain embodiments, the method includes transmitting, to the network device on the second carrier, the first assistance information including an indication of the results of interference measurement at the user equipment of the first carrier. In various embodiments, the method includes receiving, from the network device on the second carrier without performing the listen-before-talk operation, the second assistance information including an indication of the results of interference measurement at the network device of the first carrier.

Another apparatus for assistance for performing listen-before-talk operations includes a user equipment. In some embodiments, the apparatus includes a transceiver that: exchanges, with a network device in a second carrier without performing a listen-before-talk operation, assistance information for performing listen-before-talk for a first carrier, wherein the assistance information includes first assistance information and second assistance information; receives, from the network device on the second carrier without performing the listen-before-talk operation, an indication to perform interference measurement on the first carrier; transmits, to the network device on the second carrier, the first assistance information including an indication of the results of interference measurement at the user equipment of the first carrier; and receives, from the network device on the second carrier without performing the listen-before-talk operation, the second assistance information including an indication of the results of interference measurement at the network device of the first carrier.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 6 is a flow chart diagram illustrating one embodiment of a method for assistance for performing listen-before-talk operations; and FIG. 7 is a flow chart diagram illustrating another embodiment of a method for assistance for performing listen-before-talk operations.

DETAILED DESCRIPTION

Figure 1:
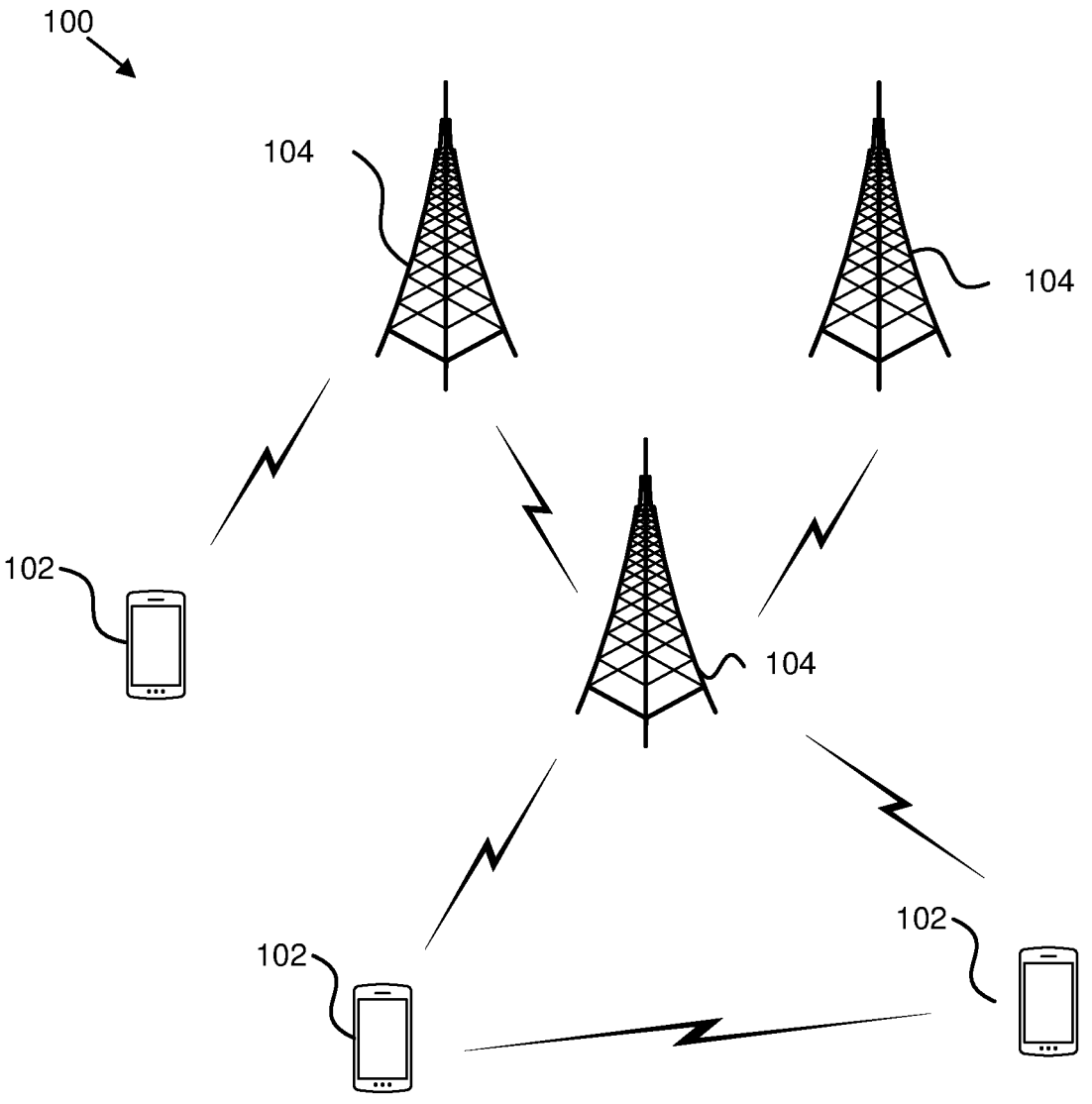
FIG. 1 is a schematic block diagram illustrating one embodiment of a wireless communication system for assistance for performing listen-before-talk operations.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures Like numbers refer to like elements in all figures, including alternate embodiments of like elements.

FIG. 1 depicts an embodiment of a wireless communication system 100 for assistance for performing listen-before-talk operations. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may exchange, at a user equipment with a network device in a second carrier without performing a listen-before-talk operation, assistance information for performing listen-before-talk for a first carrier. The assistance information includes first assistance information and second assistance information. In some embodiments, the remote unit 102 may receive, from the network device on the second carrier without performing the listen-before-talk operation, an indication to perform interference measurement on the first carrier. In certain embodiments, the remote unit 102 may transmit, to the network device on the second carrier, the first assistance information including an indication of the results of interference measurement at the user equipment of the first carrier. In various embodiments, the remote unit 102 may receive, from the network device on the second carrier without performing the listen-before-talk operation, the second assistance information including an indication of the results of interference measurement at the network device of the first carrier. Accordingly, the remote unit 102 may be used for assistance for performing listen-before-talk operations.

In certain embodiments, a network unit 104 may exchange, at a network device and with a user equipment in a second carrier without performing a listen-before-talk operation, assistance information for performing listen-before-talk for a first carrier. The assistance information includes first assistance information and second assistance information. In some embodiments, the network unit 104 may transmit, to the user equipment on the second carrier without performing the listen-before-talk operation, an indication to perform interference measurement on the first carrier. In certain embodiments, the network unit 104 may receive, from the user equipment on the second carrier, the first assistance information including an indication of the results of interference measurement at the user equipment of the first carrier. In various embodiments, the network unit 104 may transmit, to the user equipment on the second carrier without performing the listen-before-talk operation, the second assistance information including an indication of the results of interference measurement at the network device of the first carrier. Accordingly, the network unit 104 may be used for assistance for performing listen-before-talk operations.

Figure 2:
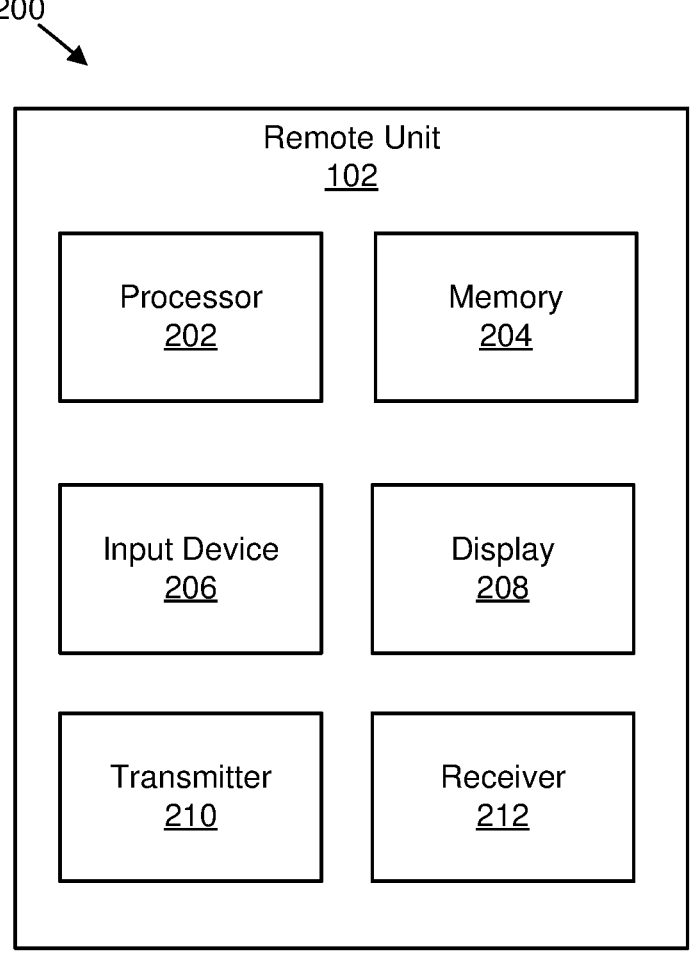
FIG. 2 is a schematic block diagram illustrating one embodiment of an apparatus that may be used for assistance for performing listen-before-talk operations.

FIG. 2 depicts one embodiment of an apparatus 200 that may be used for assistance for performing listen-before-talk operations. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
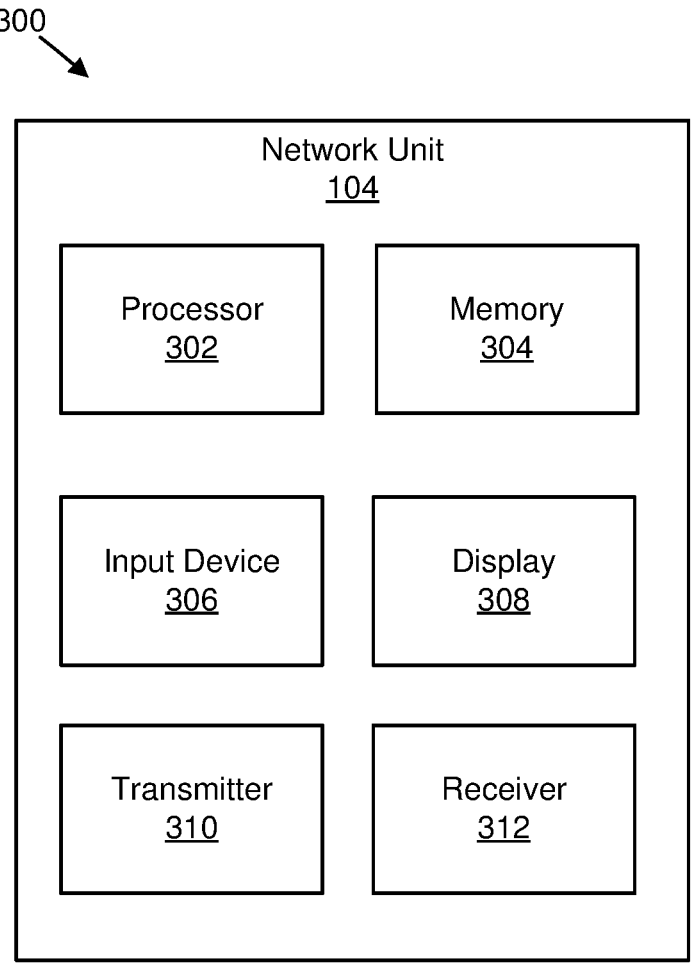
FIG. 3 is a schematic block diagram illustrating one embodiment of an apparatus that may be used for assistance for performing listen-before-talk operations.

In certain embodiments, the transceiver: exchanges, with a network device in a second carrier without performing a listen-before-talk operation, assistance information for performing listen-before-talk for a first carrier, wherein the assistance information includes first assistance information and second assistance information; receives, from the network device on the second carrier without performing the listen-before-talk operation, an indication to perform interference measurement on the first carrier; transmits, to the network device on the second carrier, the first assistance information including an indication of the results of interference measurement at the user equipment of the first carrier; and receives, from the network device on the second carrier without performing the listen-before-talk operation, the second assistance information including an indication of the results of interference measurement at the network device of the first carrier FIG. 3 depicts one embodiment of an apparatus 300 that may be used for assistance for performing listen-before-talk operations. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, a transceiver: exchanges, with a user equipment in a second carrier without performing a listen-before-talk operation, assistance information for performing listen-before-talk for a first carrier, wherein the assistance information includes first assistance information and second assistance information; transmits, to the user equipment on the second carrier without performing the listen-before-talk operation, an indication to perform interference measurement on the first carrier; receives, from the user equipment on the second carrier, the first assistance information including an indication of the results of interference measurement at the user equipment of the first carrier; and transmits, to the user equipment on the second carrier without performing the listen-before-talk operation, the second assistance information including an indication of the results of interference measurement at the network device of the first carrier.

In certain embodiments, as beam-based transmission with narrow beams is used for unlicensed spectrum in frequency range 2 ("FR2") and beyond, interfering signals from Wi-Fi access points and/or other new radio ("NR") networks working at these bands may have a directional type of transmission. In such embodiments, to avoid a hidden node problem caused by directional transmission of interferers, receiver assisted listen-before-talk ("LBT") may need to be performed. In the receiver assisted LBT, the receiver informs the transmitter about the interference seen and/or detected (e.g., from the receiver perspective) at one or more bandwidth parts ("BWPs") and/or beams. This information about the interference is signaled to the transmitter to perform transmit ("TX") LBT on some beams and/or BWPs for transmission and to avoid transmissions on beams and/or BWPs that would suffer from interference at the receive ("RX") side. This may help to avoid a hidden node problem, allow for better link budget, and/or reduce the number of LBT operations at the transmitter. However, in such embodiments, multiple handshake signaling messages are required. For example, to measure the interference at the receiver side that scans all possible beams and/or BWPs, the transmitter needs to send signals (e.g., reference signals ("RS")) for interference measurement on all possible beams and/or BWPs. Furthermore, the transmitter needs to perform LBT for each intended beam and/or BWP, the same applies for the receiver that needs to perform LBT to send the report of the interfered beams and/or BWPs which may lead to a high signaling overhead and/or higher latency to send back receiver assistance information In some embodiments, receiver assisted LBT information may be exchanged between a receiver node and a transmitter node with reduced and/or no LBT requirement.

In various embodiments, transmissions and/or receptions may be handled if a transmit power and/or receive power is constrained either due to regulatory requirements or feature requirements.

In certain embodiments, methods and corresponding signaling to allow transmissions using an underlaying low-power signal and/or channel transmission on a set of primary and/or secondary carriers in a licensed and/or an unlicensed band if the regulatory requirements or feature requirements don't allow transmission on any of the carriers using higher transmit power (e.g., without an LBT procedure for channel access in unlicensed band) than the power sufficient for the underlaying system. Furthermore, in such embodiments, low power signal and/or channel transmission may be defined based on a band of operation with an acceptable transmit power that operates within a maximum permissible equivalent isotropically radiated power ("EIRP") limits defined in regulatory requirements and aims to detect and avoid interfering transmissions.

In some embodiments, receiver assistance information exchange may be enabled for operation on a first carrier (e.g., receiver assisted LBT on a first carrier with transmit power, EIRP, and/or power spectral density ("PSD") that require an LBT procedure before transmission on the first carrier (e.g., transmit power higher than that required for the underlaying low-power signal and/or channel transmission)) between a transmitter and a receiver using the underlaying signal and/or carrier that requires no LBT procedure for channel access in an unlicensed band.

In various embodiments, an underlay signal and/or channel may be used to determine ranging or positioning estimate (e.g., absolute or relative positioning) of a transmitter or a receiver.

In certain embodiments, a signal and/or a channel (e.g., on a second carrier) used for exchanging assistance information (e.g., for operation on a first carrier, ranging, positioning) may be designed to fulfil a power limitation requirement for channel access without LBT and a detection and/or a decoding performance requirement. A low power signal of the second carrier at the transmitter and receiver may be generated using different options such as: 1) using different physical ("PHY") and different medium access control ("MAC") layers (e.g., different baseband transceiver, the radio frequency ("RF") transceiver may be shared between the first carrier and the second carrier) than that of the first carrier—the assistance information is bridged and/or collected at the high layers or sent in a higher-layer signaling message; 2) the second carrier uses a different PHY (e.g., different baseband transceiver, the RF transceiver may be shared between the first carrier and the second carrier) and share the same MAC with the first (e.g., unlicensed) carrier—both carriers use separate basebands with possibly different frame structure and different waveform for transmission and reception, while one MAC layer operates both basebands—the assistance information may be used for scheduling and/or for assisting the LBT procedure; and/or 3) the second carrier may share the same PHY and MAC layers of the (e.g., unlicensed) first carrier—both would be fully integrated with a common baseband and common frame structure; however, both may use different waveforms or different numerologies.

In some embodiments, some of downlink ("DL"), uplink ("UL"), and/or sidelink ("SL") slots or portions (e.g., symbols within a slot) are configured, indicated, and/or provided to be used for a low power signal and/or a channel transmission. In some examples, the low power signal and/or the channel transmission may occur (e.g., or be restricted) within a cyclic prefix ("CP") duration (e.g., within a fraction of the CP such as a beginning x % of the CP). The low power signal and/or channel may be generated with a proper waveform over a wide bandwidth that satisfies the conditions described herein such as pulse-based waveform similar to that used for ultrawideband ("UWB") with a configured pulse duration and pulse repetition frequency ("PRF"). The pulse-based waveform with very narrow pulses may enable distributing the transmitted power over a wide band, such that the power spectral density per MHz is reduced and enables underlaying transmission of small data (e.g., control signaling messages) without interfering and/or being interfered by regular communication signals that normally transmit with a higher power spectral density. In some examples, the low power signal and/or channel transmission may re-use at least a portion of the at least one antenna array (e.g., antenna module) used for regular communication signals and/or channels. In one example, the low power signal and/or channel transmission may be on an unused antenna array that is not currently in use or used for regular communication signals, channels transmission, and/or reception.

In various embodiments, benefits of embodiments herein may avoid a receiver-assisted LBT handshaking procedure that requires LBT for each step and enables a gNB or a user equipment ("UE") to identify the BWPs and/or beams at which the signal can be received without interference, thus avoiding the hidden nodes or hidden beams where such transmissions are not known to the gNB, with reduced signaling overhead and reduced LBT effort. It may be important to share the receiver assistance information in a timely manner as it is independent of any LBT failures. Different embodiments may be used also for no-LBT channel access to avoid directional interferers at a receiver.

In a first embodiment, there may be a sharing of receiver assisted LBT information for DL. In the first embodiment, receiver assistance information (e.g., for performing LBT at the transmitter side) for a first unlicensed carrier is transmitted in a second carrier with a transmit power less than the threshold required by LBT, where such transmission of assistance information is performed without any LBT operation.

In the first embodiment, for DL transmission, a gNB triggers the UE to perform interference measurement on one or more configured BWPs or beams. The interference measurements may be event-based trigger and/or a periodic reporting. The triggering information that carries a bit map of the intended resources may be sent using a low power signal and/or carrier. In one implementation, a trigger may contain additional information if the receiver assistance needs to be transmitted at the licensed second carrier and/or unlicensed second carrier. In another implementation, if a pulse-based waveform is used, then the signal may be modulated using on-off keying ("OOK"), binary phase shift keying ("BPSK"), and/or burst position modulation ("BPM")+BPSK. The report of the interference may be configured, indicated, and/or provided with multiple time instances (e.g., based on a configured periodicity) to report the LBT results (e.g., interference measurements, high interference BWP and/or beams, and/or preferred BWP and/or beams) on the configured BWPs and/or beams. The report is used by gNB for performing TX LBT only on the least (e.g., or generally on a subset of) interfered BWPs and/or beams based on a pre-defined interference threshold. In a further implementation, the UE reports the results of the performed interference measurements on all configured BWPs and/or beams. The report may contain the interference level associated with BWP/beam indexes.

In another implementation, the UE is indicated by gNB with a predefined interference threshold, and it reports only indications of the BWP and/or beams with interference below a configured interference threshold (e.g., these BWP and/or beams are not affected by the hidden node and/or beam interference). Conversely, another implementation may trigger the UE to report the BWPs and/or beams that are affected by the hidden node via indications of BWPs and/or beams that are measured to be higher than the configured interference threshold. To identify the correctness of a trigger and a report, a short cyclic redundancy check ("CRC") portion (e.g., 8 bits represented by OOK or BPSK of 8 consecutive pulses) may be appended to generate a modulated pulse-based signal. If the gNB failed to receive the report from the UE, it performs the usual TX LBT procedure on the intended BWPs and/or beams for the next DL transmission. In another embodiment and one implementation, a UE is configured to perform periodic LBT on multiple BWPs and/or beams and upon a trigger from the gNB using the low power signal and/or carrier, the UE transmits the LBT and/or interference measurements results from the last period of LBT and/or interference measurement. In one implementation, a gNB configures the UE with periodic reports of the LBT and/or interference measurements results at pre-defined time instances.

In another implementation, a pulse-based waveform with narrow pulses may be used to carry the assistance information between the gNB and the UE or between the UEs. In a further implementation, the same unlicensed carrier used for data transmission may be used for exchanging the assistance information at some configured slots or BWPs with low power that satisfies the LBT requirements. To allow for robust detection of these slots and/or BWPs, a high level of repetition in time and/or in frequency and a robust modulation and coding scheme may be applied. In another implementation, if the network is configured with a licensed band, then the licensed carrier may be used for exchanging the receiver assistance information for assisting the LBT of the unlicensed carrier.

In certain implementations, the UE autonomously switches to the low power transmission of receiver assistance if there is any LBT failure for the transmission of receiver assistance.

In some implementations, low power transmission of receive assistance may be transmitted in the same or first carrier where LBT is performed and the bandwidth used for the transmission at the low power signal may be same as that of the LBT bandwidth, carrier bandwidth, and/or BWP.

In various implementations, low power transmission of receiver assistance information may be transmitted using the same subcarrier spacing ("SCS") as that of the data. A radio resource control ("RRC") dedicated configuration may provide maximum transmit power for the transmission of the receiver assistance information. The maximum transmit power for the receiver assistance may be configured differently from the PCmax used for a physical uplink shared channel ("PUSCH") transmission, a physical random access channel ("PRACH") transmission, a physical uplink control channel ("PUCCH") transmission, and/or a scheduling resource ("SR").

Figure 4:
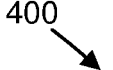
FIG. 4 is a schematic block diagram illustrating one embodiment of a system for assistance information exchange between a gNB and a UE.
Figure 4:
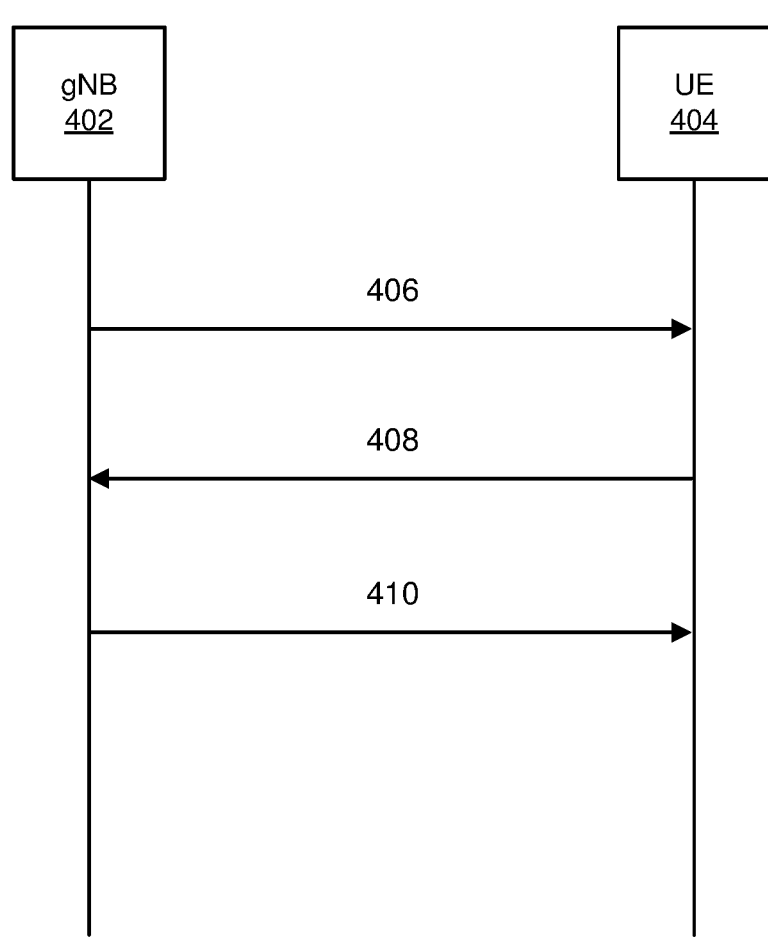

FIG. 4 is a schematic block diagram illustrating one embodiment of a system 400 for assistance information exchange between a gNB 402 and a UE 404. In a first communication 406, a low power signal is transmitted for triggering interference measurement. The UE 404 performs LBT and/or interference measurement on configured BWPs and/or beams. In a second communication 408, a low power signal is transmitted and carries LBT and/or interference measurement results (e.g., indicating BWPs and/or beams). The gNB 402 performs TX LBT on the indicated BWPs and/or beams. In a third communication 410, a DL data transmission is made on the unlicensed carrier.

In a second embodiment, there may be a sharing of receiver assisted LBT information for uplink ("UL"). In the second embodiment, receiver assistance information for performing LBT at the transmitter side for a first unlicensed carrier is transmitted in a second carrier with a transmit power less than the threshold required by LBT, where such transmission of assistance information is performed without any LBT operation.

In the second embodiment, for UL transmission, a gNB performs LBT on multiple BWPs and/or beams and sends the LBT and/or interference measurement results using low power signal and/or carrier to the UE to be used as receiver assisted LBT information for UL transmission. Upon receiving the receiver assistance information, the UE performs TX LBT only on (e.g., or generally on a subset of) the indicated BWPs and/or beams (e.g., with the least interference level). In one implementation of the second embodiment, the gNB performs receiver assisted LBT on multiple BWPs and/or beams for each UL transmission. In another implementation of the second embodiment, the gNB performs periodic LBT and/or interference measurement on multiple BWPs and/or beams and sends the LBT results to the UE for each potential UL transmission using the low power signal and/or carrier. If the UE fails to receive the low power signal and/or carrier transmission from the gNB, it performs usual TX LBT on all configured BWPs and/or beams. In one implementation of the second embodiment, a pulse-based waveform with narrow pulses is used to carry the assistance information between the gNB and the UE or between the UEs. In another implementation of the second embodiment, the same unlicensed carrier used for data transmission may be used for exchanging the assistance information at some configured slots or BWPs with low power that satisfies the LBT requirements. To allow for robust detection of these slots and/or BWPs and a high level of repetition in time and/or in frequency and a robust modulation and coding scheme may be applied. In a further implementation of the second embodiment, if the network is configured with a licensed band, then the licensed carrier may be used for exchanging the receiver assistance information for assisting the LBT of the unlicensed carrier.

Figure 5:
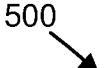
FIG. 5 is a schematic block diagram illustrating one embodiment of a system for joint ranging and assistance information exchange.
Figure 5:
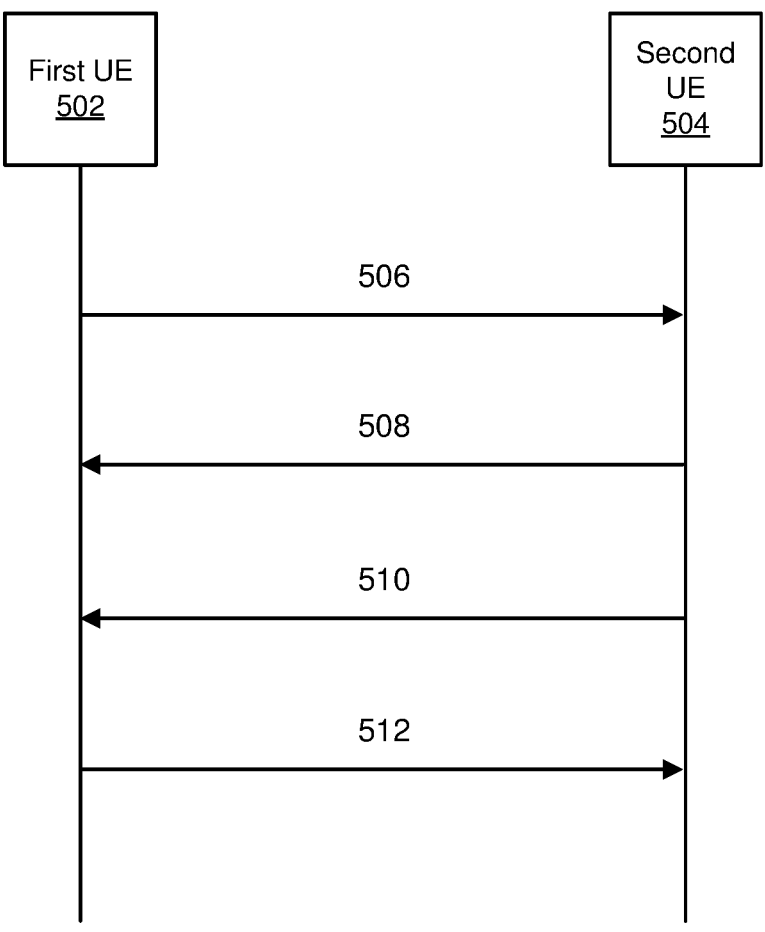

In a third embodiment, there may be joint ranging and assistance information exchange. In the third embodiment, a pulse-based waveform used for exchanging the assistance information may be used at the same time for single-sided two way ranging or double sided two way ranging between the UE and the gNB or between the UEs due to its characteristics that allow high precision ranging. This may enable the gNB and the UE or two UEs to precisely determine the range for enhanced location awareness, while avoiding the need for transmitting positioning-specific reference signals (e.g., positioning reference signals ("PRS")) which may incur high overhead and latency. Ranging signal may be modulated using OOK or BPSK to carry the trigger or the report. In certain embodiments (e.g., as shown in FIG. 5), a first UE (UE1) transmits the ranging signal that carries the control information towards a second UE (UE2). Upon receiving the trigger, UE2 transmits the same signal back to UE1 after a predefined time instance and starts retrieving the control information that may trigger performing LBT on some configured BWPs and/or beams. UE1 receives its transmitted signal back and performs one side ranging. Upon receiving the report and/or reply from UE2, UE1 transmits the report signal back after a predefined time instance that is used by UE2 to measure the range from its side. At each instance of reception and transmission of the message, the respective device may record and report the timestamp of the received or transmitted message to its peer UE and/or gNB to aid with ranging estimate computations.

In certain embodiments, UE1 and UE2 may compute the angle of arrival ("AoA") in the zenith and elevation plane to ascertain its orientation relative to the peer UE. This may also jointly aid in the ranging and LBT assistance information exchange.

FIG. 5 is a schematic block diagram illustrating one embodiment of a system 500 for joint ranging and assistance information exchange. The system 500 includes a first UE (UE1) 502, and a second UE (UE2) 504. In a first communication 506, a transmitted pulse waveform carries a receiver LBT trigger. The UE2 504 performs LBT on the configured BWPs and/or beams. In a second communication 508, the UE2 504 transmits the same signal. The UE1 502 performs ranging. In a third communication 510, the UE2 504 transmits a reply with LBT results (e.g., pulses carry the UE reply). UE1 502 receives the UE2 504 reply with the RX LBT results. In a fourth communication 512, UE1 502 transmits the same signal and then UE2 504 performs ranging.

In a fourth embodiment, there may be resource configuration for transmission and/or reception with low-power transmission. In the fourth embodiment, a network (e.g., gNB) configures a UE with a set of resources for transmitting UL channels and/or signals with low power. In one implementation of this embodiment, the configured set of resources for transmission with low-power are an alternative set of resources and are expected to be used only if the primary resources (e.g., on the same or different carrier) are not available or not possible to be used due to system and/or regulatory requirements. In some embodiments of the fourth embodiment, the resources of transmission with low power are configured as complimentary resources in addition to the resources on the same or different carrier where the high-power transmission is used. In some examples, a different priority of traffic may be associated with either low-power resources or high-power resources. Traffic with low-latency and low-reliability requirements may be transmitted on resources with low-power transmission. Further, traffic with higher latency and high reliability requirements may be transmitted only on resources with high-power transmission. Moreover, traffic with low-latency and high reliability requirements may be transmitted on both resources with low-power and high-power transmission. In various embodiments, carrier aggregation may be used on multiple carriers, where one set of carriers are allowed to be used only for low-power transmissions, while the other set of carriers may be used for high-power transmissions.

In a fifth embodiment, there may be transmission on resources with low-power in a discontinuous reception ("DRX") mode. In the fifth embodiment, if a UE is configured in an inactive and/or sleep mode in DRX, then it may be expected to monitor and/or receive DL transmissions on resources that are explicitly configured for low-power transmissions. In certain embodiments, a UE is configured to monitor physical downlink control channel ("PDCCH") for a wakeup signal ("WUS") on resources that are configured to be used for only low-power transmissions. In some embodiments, a UE is expected to receive a WUS with low-power transmission. In various embodiments, a UE is expected to receive a RS (e.g., periodic channel state information ("CSI") RS ("CSI-RS")) on resources with low-power transmission and corresponding measurement reporting considers threshold values relevant to low-power transmission that may be different from the measurement report threshold related to high-power transmissions.

FIG. 6 is a flow chart diagram illustrating one embodiment of a method 600 for assistance for performing listen-before-talk operations. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes exchanging 602, at a network device and with a user equipment in a second carrier without performing a listen-before-talk operation, assistance information for performing listen-before-talk for a first carrier. The assistance information includes first assistance information and second assistance information. In some embodiments, the method 600 includes transmitting 604, to the user equipment on the second carrier without performing the listen-before-talk operation, an indication to perform interference measurement on the first carrier. In certain embodiments, the method 600 includes receiving 606, from the user equipment on the second carrier, the first assistance information including an indication of the results of interference measurement at the user equipment of the first carrier. In various embodiments, the method 600 includes transmitting 608, to the user equipment on the second carrier without performing the listen-before-talk operation, the second assistance information including an indication of the results of interference measurement at the network device of the first carrier.

In certain embodiments, the method 600 further comprises transmitting, to the user equipment on the second carrier without performing the listen-before-talk operation, configuration information indicating resources of the first carrier to be used for uplink. In some embodiments, the second carrier overlaps the first carrier in the frequency domain. In various embodiments, the method 600 further comprises transmitting a trigger for the exchanging of the assistance information in the second carrier without the listen-before-talk operation being performed.

In one embodiment, the trigger comprises a configuration of a measurement performed at the first carrier, and the configuration of the measurement comprises an indication of at least one bandwidth part, at least one beam, or a combination thereof. In certain embodiments, the assistance information comprises a measurement of interference power for each configured bandwidth part, each configured beam, or a combination thereof. In some embodiments, the assistance information comprises indices of bandwidth parts, beams, or a combination thereof passing an interference threshold.

In various embodiments, the assistance information is used to select bandwidth parts, beams, or a combination thereof to perform listen-before-talk. In one embodiment, signaling used for exchanging the assistance information is generated based on a pulse-based waveform with narrow pulses. In certain embodiments, the pulse-based waveform uses a low power and a wide bandwidth, and the pulse-based waveform is repeated to increase reliability.

In some embodiments, the pulse-based waveform is generated by masking part of a cyclic prefix of symbols of the first carrier with narrow pulses that carry the assistance information. In various embodiments, signaling used for exchanging the assistance information is generated based on a waveform of the first carrier. In one embodiment, the waveform uses a low power, and a subcarrier spacing different than that of the first carrier and repetition of the waveform are used to increase reliability. In certain embodiments, signaling used for exchanging the assistance information is generated based on a licensed carrier using a physical layer control signaling, high layer radio resource control signaling, or a medium access control control element.

FIG. 7 is a flow chart diagram illustrating another embodiment of a method 700 for assistance for performing listen-before-talk operations. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes exchanging 702, at a user equipment with a network device in a second carrier without performing a listen-before-talk operation, assistance information for performing listen-before-talk for a first carrier. The assistance information includes first assistance information and second assistance information. In some embodiments, the method 700 includes receiving 704, from the network device on the second carrier without performing the listen-before-talk operation, an indication to perform interference measurement on the first carrier. In certain embodiments, the method 700 includes transmitting 706, to the network device on the second carrier, the first assistance information including an indication of the results of interference measurement at the user equipment of the first carrier. In various embodiments, the method 700 includes receiving 708, from the network device on the second carrier without performing the listen-before-talk operation, the second assistance information including an indication of the results of interference measurement at the network device of the first carrier.

In certain embodiments, the method 700 further comprises receiving, from the network device on the second carrier without performing the listen-before-talk operation, configuration information indicating resources of the first carrier to be used for uplink. In some embodiments, the second carrier overlaps the first carrier in the frequency domain. In various embodiments, the method 700 further comprises receiving a trigger for the exchanging of the assistance information in the second carrier without the listen-before-talk operation being performed.

In one embodiment, the trigger comprises a configuration of a measurement performed at the first carrier, and the configuration of the measurement comprises an indication of at least one bandwidth part, at least one beam, or a combination thereof. In certain embodiments, the assistance information comprises a measurement of interference power for each configured bandwidth part, each configured beam, or a combination thereof. In some embodiments, the assistance information comprises indices of bandwidth parts, beams, or a combination thereof passing an interference threshold.

In various embodiments, the assistance information is used to select bandwidth parts, beams, or a combination thereof to perform listen-before-talk. In one embodiment, signaling used for exchanging the assistance information is generated based on a pulse-based waveform with narrow pulses. In certain embodiments, the pulse-based waveform uses a low power and a wide bandwidth, and the pulse-based waveform is repeated to increase reliability.

In some embodiments, the pulse-based waveform is generated by masking part of a cyclic prefix of symbols of the first carrier with narrow pulses that carry the assistance information. In various embodiments, signaling used for exchanging the assistance information is generated based on a waveform of the first carrier. In one embodiment, the waveform uses a low power, and a subcarrier spacing different than that of the first carrier and repetition of the waveform are used to increase reliability. In certain embodiments, signaling used for exchanging the assistance information is generated based on a licensed carrier using a physical layer control signaling, high layer radio resource control signaling, or a medium access control control element.

In one embodiment, a method of a network device comprises: exchanging, with a user equipment in a second carrier without performing a listen-before-talk operation, assistance information for performing listen-before-talk for a first carrier, wherein the assistance information comprises first assistance information and second assistance information; transmitting, to the user equipment on the second carrier without performing the listen-before-talk operation, an indication to perform interference measurement on the first carrier; receiving, from the user equipment on the second carrier, the first assistance information comprising an indication of the results of interference measurement at the user equipment of the first carrier; and transmitting, to the user equipment on the second carrier without performing the listen-before-talk operation, the second assistance information comprising an indication of the results of interference measurement at the network device of the first carrier.

In certain embodiments, the method further comprises transmitting, to the user equipment on the second carrier without performing the listen-before-talk operation, configuration information indicating resources of the first carrier to be used for uplink.

In some embodiments, the second carrier overlaps the first carrier in the frequency domain.

In various embodiments, the method further comprises transmitting a trigger for the exchanging of the assistance information in the second carrier without the listen-before-talk operation being performed.

In one embodiment, the trigger comprises a configuration of a measurement performed at the first carrier, and the configuration of the measurement comprises an indication of at least one bandwidth part, at least one beam, or a combination thereof.

In certain embodiments, the assistance information comprises a measurement of interference power for each configured bandwidth part, each configured beam, or a combination thereof.

In some embodiments, the assistance information comprises indices of bandwidth parts, beams, or a combination thereof passing an interference threshold.

In various embodiments, the assistance information is used to select bandwidth parts, beams, or a combination thereof to perform listen-before-talk.

In one embodiment, signaling used for exchanging the assistance information is generated based on a pulse-based waveform with narrow pulses.

In certain embodiments, the pulse-based waveform uses a low power and a wide bandwidth, and the pulse-based waveform is repeated to increase reliability.

In some embodiments, the pulse-based waveform is generated by masking part of a cyclic prefix of symbols of the first carrier with narrow pulses that carry the assistance information.

In various embodiments, signaling used for exchanging the assistance information is generated based on a waveform of the first carrier.

In one embodiment, the waveform uses a low power, and a subcarrier spacing different than that of the first carrier and repetition of the waveform are used to increase reliability.

In certain embodiments, signaling used for exchanging the assistance information is generated based on a licensed carrier using a physical layer control signaling, high layer radio resource control signaling, or a medium access control control element.

In one embodiment, an apparatus comprises a network device. The apparatus further comprises: a transceiver that: exchanges, with a user equipment in a second carrier without performing a listen-before-talk operation, assistance information for performing listen-before-talk for a first carrier, wherein the assistance information comprises first assistance information and second assistance information; transmits, to the user equipment on the second carrier without performing the listen-before-talk operation, an indication to perform interference measurement on the first carrier; receives, from the user equipment on the second carrier, the first assistance information comprising an indication of the results of interference measurement at the user equipment of the first carrier; and transmits, to the user equipment on the second carrier without performing the listen-before-talk operation, the second assistance information comprising an indication of the results of interference measurement at the network device of the first carrier.

In certain embodiments, the transceiver transmits, to the user equipment on the second carrier without performing the listen-before-talk operation, configuration information indicating resources of the first carrier to be used for uplink.

In some embodiments, the second carrier overlaps the first carrier in the frequency domain.

In various embodiments, the transceiver transmits a trigger for the exchanging of the assistance information in the second carrier without the listen-before-talk operation being performed.

In one embodiment, the trigger comprises a configuration of a measurement performed at the first carrier, and the configuration of the measurement comprises an indication of at least one bandwidth part, at least one beam, or a combination thereof.

US 12,581,532 B2

19

In certain embodiments, the assistance information comprises a measurement of interference power for each configured bandwidth part, each configured beam, or a combination thereof.

In some embodiments, the assistance information comprises indices of bandwidth parts, beams, or a combination thereof passing an interference threshold.

In various embodiments, the assistance information is used to select bandwidth parts, beams, or a combination thereof to perform listen-before-talk.

In one embodiment, signaling used for exchanging the assistance information is generated based on a pulse-based waveform with narrow pulses.

In certain embodiments, the pulse-based waveform uses a low power and a wide bandwidth, and the pulse-based waveform is repeated to increase reliability.

In some embodiments, the pulse-based waveform is generated by masking part of a cyclic prefix of symbols of the first carrier with narrow pulses that carry the assistance information.

In various embodiments, signaling used for exchanging the assistance information is generated based on a waveform of the first carrier.

In one embodiment, the waveform uses a low power, and a subcarrier spacing different than that of the first carrier and repetition of the waveform are used to increase reliability.

In certain embodiments, signaling used for exchanging the assistance information is generated based on a licensed carrier using a physical layer control signaling, high layer radio resource control signaling, or a medium access control control element.

In one embodiment, a method of a user equipment comprises: exchanging, with a network device in a second carrier without performing a listen-before-talk operation, assistance information for performing listen-before-talk for a first carrier, wherein the assistance information comprises first assistance information and second assistance information; receiving, from the network device on the second carrier without performing the listen-before-talk operation, an indication to perform interference measurement on the first carrier; transmitting, to the network device on the second carrier, the first assistance information comprising an indication of the results of interference measurement at the user equipment of the first carrier; and receiving, from the network device on the second carrier without performing the listen-before-talk operation, the second assistance information comprising an indication of the results of interference measurement at the network device of the first carrier.

In certain embodiments, the method further comprises receiving, from the network device on the second carrier without performing the listen-before-talk operation, configuration information indicating resources of the first carrier to be used for uplink.

In some embodiments, the second carrier overlaps the first carrier in the frequency domain.

In various embodiments, the method further comprises receiving a trigger for the exchanging of the assistance information in the second carrier without the listen-before-talk operation being performed.

In one embodiment, the trigger comprises a configuration of a measurement performed at the first carrier, and the configuration of the measurement comprises an indication of at least one bandwidth part, at least one beam, or a combination thereof.

20

In certain embodiments, the assistance information comprises a measurement of interference power for each configured bandwidth part, each configured beam, or a combination thereof.

In some embodiments, the assistance information comprises indices of bandwidth parts, beams, or a combination thereof passing an interference threshold.

In various embodiments, the assistance information is used to select bandwidth parts, beams, or a combination thereof to perform listen-before-talk.

In one embodiment, signaling used for exchanging the assistance information is generated based on a pulse-based waveform with narrow pulses.

In certain embodiments, the pulse-based waveform uses a low power and a wide bandwidth, and the pulse-based waveform is repeated to increase reliability.

In some embodiments, the pulse-based waveform is generated by masking part of a cyclic prefix of symbols of the first carrier with narrow pulses that carry the assistance information.

In various embodiments, signaling used for exchanging the assistance information is generated based on a waveform of the first carrier.

In one embodiment, the waveform uses a low power, and a subcarrier spacing different than that of the first carrier and repetition of the waveform are used to increase reliability.

In certain embodiments, signaling used for exchanging the assistance information is generated based on a licensed carrier using a physical layer control signaling, high layer radio resource control signaling, or a medium access control control element.

In one embodiment, an apparatus comprises a user equipment. The apparatus further comprises: a transceiver that: exchanges, with a network device in a second carrier without performing a listen-before-talk operation, assistance information for performing listen-before-talk for a first carrier, wherein the assistance information comprises first assistance information and second assistance information; receives, from the network device on the second carrier without performing the listen-before-talk operation, an indication to perform interference measurement on the first carrier; transmits, to the network device on the second carrier, the first assistance information comprising an indication of the results of interference measurement at the user equipment of the first carrier; and receives, from the network device on the second carrier without performing the listen-before-talk operation, the second assistance information comprising an indication of the results of interference measurement at the network device of the first carrier.

In certain embodiments, the transceiver receives, from the network device on the second carrier without performing the listen-before-talk operation, configuration information indicating resources of the first carrier to be used for uplink.

In some embodiments, the second carrier overlaps the first carrier in the frequency domain.

In various embodiments, the transceiver receives a trigger for the exchanging of the assistance information in the second carrier without the listen-before-talk operation being performed.

In one embodiment, the trigger comprises a configuration of a measurement performed at the first carrier, and the configuration of the measurement comprises an indication of at least one bandwidth part, at least one beam, or a combination thereof.

In certain embodiments, the assistance information comprises a measurement of interference power for each configured bandwidth part, each configured beam, or a combination thereof.

In some embodiments, the assistance information comprises indices of bandwidth parts, beams, or a combination thereof passing an interference threshold.

In various embodiments, the assistance information is used to select bandwidth parts, beams, or a combination thereof to perform listen-before-talk.

In one embodiment, signaling used for exchanging the assistance information is generated based on a pulse-based waveform with narrow pulses.

In certain embodiments, the pulse-based waveform uses a low power and a wide bandwidth, and the pulse-based waveform is repeated to increase reliability.

In some embodiments, the pulse-based waveform is generated by masking part of a cyclic prefix of symbols of the first carrier with narrow pulses that carry the assistance information.

In various embodiments, signaling used for exchanging the assistance information is generated based on a waveform of the first carrier.

In one embodiment, the waveform uses a low power, and a subcarrier spacing different than that of the first carrier and repetition of the waveform are used to increase reliability.

In certain embodiments, signaling used for exchanging the assistance information is generated based on a licensed carrier using a physical layer control signaling, high layer radio resource control signaling, or a medium access control control element.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a network device, the method comprising:

exchanging, with a user equipment (UE) in a second carrier without performing a listen-before-talk (LBT) operation, assistance information for performing LBT for a first carrier, wherein the assistance information comprises first assistance information and second assistance information;

transmitting, to the UE on the second carrier without performing the LBT operation, an indication to perform interference measurement on the first carrier;

receiving, from the UE on the second carrier, the first assistance information comprising results of interference measurement at the UE of the first carrier; and transmitting, to the UE on the second carrier without performing the LBT operation, the second assistance information comprising results of interference measurement at the network device of the first carrier.

2. The method of claim 1, further comprising transmitting, to UE on the second carrier without performing the LBT operation, configuration information indicating resources of the first carrier to be used for uplink.

3. The method of claim 1, wherein the second carrier overlaps the first carrier in frequency domain.

4. The method of claim 1, further comprising transmitting a trigger for the exchanging of the assistance information in the second carrier without the LBT operation being performed.

5. The method of claim 4, wherein the trigger comprises a configuration of a measurement performed at the first carrier, and the configuration of the measurement comprises an indication of at least one bandwidth part, at least one beam, or a combination thereof.

6. The method of claim 1, wherein signaling used for exchanging the assistance information is generated based on a pulse-based waveform with narrow pulses.

7. The method of claim 6, wherein the pulse-based waveform uses a low power and a wide bandwidth, and the pulse-based waveform is repeated to increase reliability.

8. The method of claim 6, wherein the pulse-based waveform is generated by masking part of a cyclic prefix of symbols of the first carrier with narrow pulses that carry the assistance information.

9. The method of claim 1, wherein signaling used for exchanging the assistance information is generated based on a licensed carrier using a physical layer control signaling, high layer radio resource control (RRC) signaling, or a medium access control control element (MAC CE).

10. A base station for wireless communication, comprising:

at least one memory; and at least one processor coupled with the at least one memory and configured to cause the base station to:

exchange, with a user equipment (UE) in a second carrier without performing a listen-before-talk (LBT) operation, assistance information for performing LBT for a first carrier, wherein the assistance information comprises first assistance information and second assistance information;

transmit, to the UE on the second carrier without performing the LBT operation, an indication to perform interference measurement on the first carrier;

receive, from the UE on the second carrier, the first assistance information comprising results of interference measurement at the UE of the first carrier; and transmit, to the UE on the second carrier without performing the LBT operation, the second assistance information comprising results of interference measurement at the base station of the first carrier.

11. The base station of claim 10, wherein the at least one processor is configured to cause the base station to transmit, to the UE on the second carrier without performing the LBT operation, configuration information indicating resources of the first carrier to be used for uplink.

12. The base station of claim 10, wherein the at least one processor is configured to cause the base station to transmit a trigger for the exchanging of the assistance information in the second carrier without the LBT operation being performed.

13. A user equipment (UE) for wireless communication, comprising:

at least one memory; and at least one processor coupled with the at least one memory and configured to cause the UE to:

exchange, with a base station in a second carrier without performing a listen-before-talk (LBT) operation, assistance information for performing LBT for a first carrier, wherein the assistance information comprises first assistance information and second assistance information;

receive, from the base station on the second carrier without performing the LBT operation, an indication to perform interference measurement on the first carrier;

transmit, to the base station on the second carrier, the first assistance information comprising results of interference measurement at the user equipment of the first carrier; and receive, from the base station on the second carrier without performing the LBT operation, the second assistance information comprising results of interference measurement at the base station of the first carrier.

14. The UE of claim 13, wherein the at least one processor is configured to cause the UE to receive, from the base station on the second carrier without performing the LBT operation, configuration information indicating resources of the first carrier to be used for uplink.

15. The UE of claim 13, wherein the second carrier overlaps the first carrier in frequency domain.

16. A processor for wireless communication, comprising:

at least one controller coupled with at least one memory and configured to cause the processor to:

exchange, with a base station in a second carrier without performing a listen-before-talk (LBT) operation, assistance information for performing LBT for a first carrier, wherein the assistance information comprises first assistance information and second assistance information;

receive, from the base station on the second carrier without performing the LBT operation, an indication to perform interference measurement on the first carrier;

transmit, to the base station on the second carrier, the first assistance information comprising results of interference measurement at a user equipment (UE) of the first carrier; and receive, from the base station on the second carrier without performing the LBT operation, the second assistance information comprising results of interference measurement at the base station of the first carrier.

17. The processor of claim 16, wherein the at least one controller is configured to cause the processor to receive, from the base station on the second carrier without performing the LBT operation, configuration information indicating resources of the first carrier to be used for uplink.

18. The processor of claim 16, wherein the second carrier overlaps the first carrier in frequency domain.

19. The base station of claim 10, wherein the second carrier overlaps the first carrier in frequency domain.

20. The base station of claim 12, wherein the trigger comprises a configuration of a measurement performed at the first carrier, and the configuration of the measurement comprises an indication of at least one bandwidth part, at least one beam, or a combination thereof.

* * * * *